ced by radiations of shorter wave length.
UNITED STATES PATENT OFFICE 2,402,855

LUMINESCENT MATERIAL AND METHOD OF PREPARING THE SAME

William P. Toorks, Salem, Mass., assignor to Sylvania Electric Products Inc., Salem, Mass., a corporation of Massachusetts No Drawing. Application April 8, 1943, Serial No. 482,342

3 Claims. (Cl. 252—301.4)

This invention relates to luminescent materials and particularly to luminescent materials for use in electric discharge lamps.

An object of the invention is to provide a luminescent material which emits ultraviolet radiations of long wavelength, particularly when excited by radiations of shorter wave length.

A further object is the production of a stable and highly efficient luminescent material of that type.

A feature of the invention is the use of a material comprising calcium and cerium phosphates and in particular a material made from cerium phosphate and a combination of dibasic calcium phosphate and tri-calcium phosphate.

Still another feature is a method of manufacturing such a luminescent material. Other features and advantages of the invention will be apparent from a study of the following specification.

The material of my invention may be prepared by mixing tri-calcium phosphate, dibasic calcium phosphate, and cerium phosphate, together in acetone or other suitable vehicle. This mixture is then ground and ball-milled, filtered, dried and fired at a high temperature for several hours. It will then be in the form of a fairly soft mass of agglomerates of particles, which can be broken up physically by ball-milling again, preferably in acetone. This ball-milling after firing often increases the brightness of the resulting material.

The firing temperature may preferably be 2340° F., and should be above 2100° F. if the material is to have the proper brightness.

Commercial tri-calcium phosphate may contain from 1% to 75% dibasic phosphate, the exact amount present being difficult to determine. For this reason, I have made my own tri-calcium phosphate by mixing 72 pounds of purified calcium chloride in solution with 16 gallons of water and 11.1 liters of 85% phosphoric acid C. P. I have then poured this solution into a separate solution of ammonia in water at about 80° C. The phosphate should be poured into the ammonia and not vice-versa. The resulting solution should be stirred rapidly as the phosphate is poured into it, and the ammonia should be present in excess, that is, in an amount more than sufficient to neutralize the acid.

The resulting precipitate should be filtered, but not allowed to dry at that time. It may be resuspended in water, and re-filtered; and then suspended in acetone, filtered, and dried.

The resulting material, which I have called tri-calcium phosphate is then mixed with so-called dibasic phosphate of C. P. or reagent grade and with cerium phosphate in the following approximate proportions:

| | Grams |
|---|---|
| Tri-calcium phosphate | 22.5 |
| Dibasic calcium phosphate | 9.0 |
| Cerium phosphate | 4.0 |

Because of the fact that even C. P. or reagent grade dibasic phosphate contains an indeterminate amount of tri-calcium phosphate, the exact amount of so-called dibasic phosphate in the mixture will generally have to be determined by making up a few samples and testing for brightness. The amount will ordinarily fall between 7 and 11 grams, however, but is very critical. The brightness of the resulting material will at first rise as dibasic phosphate is added up to a critical point and will then fall off as more is added. The rise and fall are both sharp, but the fall is much sharper.

I have made batches 25 times as large as the foregoing weights indicate, but the proportions, of course, remained the same.

The amount of cerium phosphate necessary for maximum brightness is less critical, but will ordinarily fall between 5 and 30%, with 10 to 15% generally preferable.

The cerium phosphate used should be quite pure, and as free as possible from iron. I have found such a material can be prepared by purifying a solution of cerous nitrate first in a weak solution of hydrochloric acid with hydrogen sulfide; then adding a large excess of ammonium hydroxide (plus sufficient tartaric acid to keep the cerium in solution) and treating with ammonium sulfide. This purified cerium solution may then be precipitated as the phosphate by the addition of a solution of dibasic ammonium phosphate (previously purified with ammonium sulfide), both solutions being hot. (The cerous nitrate may be at 90° C., and the phosphate at 70° C.) In this process I use approximately 400 gms. of cerous nitrate (hydrated) and 200 gms. dibasic ammonium phosphate.

The luminescent material of my invention is quite stable, and can be applied to the interior of a lamp bulb by the usual methods. It may for example, be mixed in a solution of nitrocellulose in amyl acetate or the like, applied to the interior of the bulb and baked at high temperature in air to break down and oxidize the nitrocellulose. Bringing the luminescent material in air to the temperature necessary to remove the nitrocellulose will not greatly reduce the brightness of the luminescent material.

What I claim is:

1. A luminescent material comprising a fired mixture of tri-calcium phosphate, dibasic calcium phosphate and cerium phosphate, in which the dibasic phosphate is just below a critical value in the neighborhood of 7 to 11 parts dibasic phosphate to 23 parts tri-calcium phosphate, at which the ultra-violet emitting brightness diminishes.

2. A luminescent material comprising a fired mixture of about 23 parts tri-calcium phosphate, 7 to 11 parts dibasic calcium phosphate of C. P. or reagent grade, and about 4 parts of cerium phosphate.

3. The method of making a luminescent material which comprises: making tri-calcium phosphate by mixing calcium chloride and phosphoric acid in the proportion of 72 pounds of calcium chloride to 11.1 liters of 85% phosphoric acid C. P.; mixing said tri-calcium phosphate, dibasic calcium phosphate, and cerium phosphate in the approximate proportion of 22.5:9:4: by weight; ball-milling the mixture in acetone; filtering it; drying it; and then firing it at about 2300° F.

WILLIAM P. TOORKS.